United States Patent [19]

Cherukuri et al.

[11] 4,409,244

[45] Oct. 11, 1983

[54] CHEWING GUM CONTAINING FRUCTOSE SYRUP

[75] Inventors: Subraman R. Cherukuri; Dominick R. Friello, both of Danbury; Walter Hopkins, Greenwich, all of Conn.; Ellery Parker, Johnstown; Donald A. M. Mackay, Pleasantville, both of N.Y.

[73] Assignee: Nabisco Brands, Inc., Parsippany, N.J.

[21] Appl. No.: 407,686

[22] Filed: Aug. 13, 1982

Related U.S. Application Data

[63] Continuation of Ser. No. 217,625, Dec. 18, 1980, abandoned.

[51] Int. Cl.³ .............................................. A23G 3/30
[52] U.S. Cl. ........................................... 426/5; 426/4
[58] Field of Search ....................................... 426/3–6, 426/548, 658

[56] References Cited

U.S. PATENT DOCUMENTS

| | | | |
|---|---|---|---|
| 4,238,475 | 12/1980 | Witzel | 426/3 X |
| 4,271,198 | 6/1981 | Cherukuri et al. | 426/3 |
| 4,271,199 | 6/1981 | Cherukuri et al. | 426/5 |

*Primary Examiner*—Jeanette M. Hunter
*Attorney, Agent, or Firm*—Richard Kornutik

[57] ABSTRACT

A chewing gum is provided which has a soft consistency, an easy bite through, improved flavor characteristics and shelf-life and does not stick to its wrapper. These advantages are attained through the use of pure fructose syrup in place of corn syrup as a sweetener-plasticizer-bulking agent.

5 Claims, No Drawings

CHEWING GUM CONTAINING FRUCTOSE SYRUP

This is a continuation of application Ser. No. 217,625, filed Dec. 18, 1980, now abandoned.

FIELD OF THE INVENTION

The present invention relates to chewing gum containing pure fructose syrup as a replacement for corn syrup.

BACKGROUND OF THE INVENTION

Corn syrups generally have a clean, pleasant, sweet taste which makes them excellent plasticizing agents for chewing gum. Chewing gums containing corn syrup have enjoyed huge success on the market place. However, in spite of such success, still such chewing gums could stand improvement in the area of softness, sweetness, flavor release and chew.

DESCRIPTION OF THE INVENTION

In accordance with the present invention, a chewing gum is provided which contains pure fructose syrup (also referred to as high fructose corn syrup) as a replacement for corn syrup. It was previously thought that it would be impossible to employ large amounts of pure fructose syrup in chewing gum because of high water absorption resulting in extreme sweating problems and sticking of the chewing gum to its wrapper. Surprisingly, it has been found that when all of the corn syrup normally used in chewing gum is replaced with pure fructose syrup, the resulting chewing gum not only does not stick to its wrapper in the quantities usually employed, but has unique textural, flavor and sweetness properties as compared to corn syrup containing chewing gum, namely, softer consistency, easier bite through, easier bubble blowing, less sticking of bubble gum, improved flavor characteristics and less plasticity, all of the above being attained without the need for additional humectants to maintain good stability and shelf-life. Where corn syrup is employed in chewing gums, an additional humectant, such as glycerin is required to insure proper stability.

The chewing gum of the invention which has a short-structure, that is, is easily torn apart, will comprise gum base, pure fructose syrup, sweetener-bulking agent, such as sucrose, flavor and optionally additional plasticizer and color.

In carrying out the present invention, the pure fructose syrup will be employed in an amount within the range of from about 5 to about 30%, and preferably from about 8 to about 20% by weight of the chewing gum. The fructose syrup will contain from about 25 to about 95% solids, and preferably from about 40 to about 90% solids, in the form of fructose. Alternatively, the chewing gum of the invention may contain fructose solids in amounts equivalent to that present in the fructose syrup, as described above.

As indicated, the chewing gum may include a sweetener-bulking agent which will be employed in an amount of from about 30 to about 80% by weight, and preferably, from about 45 to about 70% by weight.

Examples of sweetener-bulking agents which may be employed herein include sugars, for example, monosaccharides of 5 or 6 carbon atoms, such as arabinose, xylose, ribose, glucose, mannose, galactose, fructose, dextrose, or sorbose or mixtures of two or more of the foregoing monosaccharides; disaccharides, for example, sucrose, such as cane or beet sugar, lactose, maltose or cellobiose; polysaccharides, such as partially hydrolyzed starch or dextrin, as well as polyols, such as sorbitol, mannitol, xylitol, mixtures thereof and mixtures with one or more of the above sugars.

The chewing gum of the invention may also contain an artificial sweetener, such as, for example, aspartame, cyclamate, or a saccharin or other sweetener as set out hereinafter, the artificial sweetener being present in an amount of from about 0 to about 0.5% by weight, and preferably, from about 0.05 to about 0.2% by weight.

Examples of artificial sweeteners which may be employed herein include sodium, calcium or ammonium saccharide salts, dihydrochalcones, glycyrrhizin, dipotassium glycyrrhizin, glycyrrhizic acid ammonium salt, L-aspartyl-L-phenylalanine methyl ester, (aspartame), the sodium or potassium salt of 3,4-dihydro-6-methyl-1,2,3-oxathiazine-4-one-2,2-dioxide (Ace-sulfame-K), as well as *Stevia rebaudiana* (Stevioside), *Richardella dulcifica* (Miracle Berry), *Dioscoreophyllum cumminsii* (Serendipity Berry), cyclamate salts, and the like, or mixtures of any two or more of the above.

The chewing gum will include a relatively water-insoluble, water-impenetrable gum base in an amount ranging from about 8 to about 50%, and preferably from about 15 to 40% by weight of the chewing gum composition. The gum base employed may be bubble gum base or non-bubble gum base.

In general, the gum base is prepared by heating and blending various ingredients, such as natural gum, synthetic resins, waxes, plasticizers, etc., in a manner well known in the art. Typical examples of the ingredients found in a chewing gum base are masticatory substances of vegetable origin, such as chicle, crown gum, nispero, rosidinha, jelutong, pendare, perillo, niger gutta, tunu, etc., masticatory substances of synthetic origin, such as butadiene-styrene copolymer, isobutylene-isoprene copolymer, petroleum wax, polyethylene, polyisobutylene, polyvinylacetate, etc., plasticizers, such as lanolin, stearic acid, sodium stearate, potassium stearate, etc., antioxidants, such as, butylated hydroxyanisole, butylated hydroxytoluene, and propyl gallate.

The water-insoluble gum base may consist of any of the various bases disclosed for example in U.S. Pat. Nos. 3,052,552 and 2,197,719. Typical ingredients included in gum base compositions are the following:

|  | Parts by Weight |
|---|---|
| Base I | |
| Ester gum | 88 |
| Rubber latex solids | 10 |
| Lecithin | 2 |
| Base II | |
| Chicle | 30 |
| Jelutong | 60 |
| Gutta soh | 8 |
| Lecithin | 2 |
| Base III | |
| Partially oxidized chicle | 98 |
| Lecithin | 2 |
| Base IV | |
| Jelutong (dry) | 80 |
| Gutta siak | 18 |
| Lecithin | 2 |

The chewing gum may also include flavoring, such as sour or fruit flavoring or non-acid or mint flavoring in an amount ranging from about 0.3 to about 2.0% by weight, and preferably from about 0.5 to about 1.2% by weight of the final gum product. The flavoring may comprise synthetic flavors and oils derived from plants, leaves, flowers, fruit, etc. Representative flavor oils which may also be employed in the chewing gum of the invention include acids, such as adipic, succinic and fumaric acid, citrus oils, such as lemon oil, orange oil, lime oil, grapefruit oil, fruit essences, such as apple essence, pear essence, peach essence, strawberry essence, apricot essence, raspberry essence, cherry essence, plum essence, pineapple essence, as well as the following essential oils: peppermint oil, spearmint oil, mixtures of peppermint oil and spearmint oil, clove oil, bay oil, anise oil, eucalyptus oil, thyme oil, cedar leaf oil, cinnamon oil, oil of nutmeg, oil of sage, oil of bitter almonds, cassia oil, and methylsalicylate (oil of wintergreen). Various synthetic flavors, such as mixed fruit, may also be employed.

The chewing gum may also contain conventional ester gums, polydextrose, fillers, such as calcium carbonate, and talc and texturizers, such as hydrated alumina, plasticizers, softeners or emulsifiers, such as lecithin, fatty acids, glyceryl monostearate, hydrogenated vegetable oils, sorbitan monostearate, tallow, propylene glycol, F.D. & C. coloring agents, other gums, such as gum acacia, locust bean, cellulose and the like to impart necessary body, and other conventional chewing gum additives as will be apparent to those skilled in the art.

Preferred chewing gum compositions in accordance with the invention are set out below.

| Ingredient | Parts by Weight |
| --- | --- |
| Gum base | 10 to 30 |
| Pure fructose syrup (40 to 90% fructose solids) | 8 to 25 |
| Sugar (or other bulking agent) | 40 to 75 |
| Liquid flavor | 0.5 to 1.5 |
| Other plasticizer | 0.2 to 2 |
| Color | 0 to 0.5 |

The chewing gum of the invention may be prepared by conventional gum making techniques.

In a preferred method for making the chewing gum of the invention, gum base is melted and maintained at 180° F. to 200° F., about ½ of the sweetener-bulking agent is mixed with the gum base to disperse same throughout the continuous mass of gum base thereby trapping the sweetener-bulking agent in the gum base.

Thereafter, the flavor is added with mixing and the remaining sweetener-bulking agent is added with mixing thereby causing the mass to be torn apart into discrete pieces. The pure fructose syrup is added to the discrete pieces of gum base with mixing and other flavors including spray dried flavor may then be added with mixing. The mass, now smooth and continuous, is then ready for being cut into pieces and wrapped.

It will be appreciated that the pure fructose syrup may be added before the second batch of sweetener-bulking agent is added, and/or as described above, after the second batch of sweetener-bulking agent.

The following Example illustrates preferred embodiments of the invention.

EXAMPLE

A flavored chewing gum of the following composition, in accordance with the present invention, is prepared as described below.

| | Parts by Weight |
| --- | --- |
| Gum base | 17 |
| Sugar (dispersed in melted gum base) | 30 |
| (mixed with cooled gum base) | 30 |
| Fructose syrup (42% fructose solids) | 21 |
| Liquid flavor | 1 |
| Spray dried flavor | 1 |

The gum base is added to a steam jacketed kettle equipped with a sigma blade mixer. The base is melted and adjusted to a temperature of about 180° F. to 200° F.

About one-half of the sugar is thoroughly mixed into the melted gum base (while the gum base is folding well) for about 3 minutes to disperse the sugar through out the continuous mass of gum base. The sugar is thereby trapped in or otherwise protected by the gum base.

Thereafter, the liquid flavor is added with mixing for about 1 minute. The remaining sugar is added with mixing for about 2 minutes thereby causing the mass to be torn apart into discrete pieces. The pure fructose syrup is added to the discrete pieces of gum base with mixing for about 2 minutes, and the spray dried flavor is added with mixing for about 2 minutes. The mass, now smooth and continuous, is removed from the kettle and formed into chewing gum pieces and wrapped.

The so-formed gum is found to be easily unwrapped and has a clean fresh taste, easy bite through, is soft and has improved flavor characteristics.

What is claimed is:

1. A chewing gum having good shelf-life, is easy to remove from its wrapper and is free of corn syrup, said chewing gum consisting essentially of particles of gum base, a first portion of sugar dispersed and trapped in said particles of gum base, a second portion of sugar mixed with said particles of gum base containing said first portion of sugar, and pure fructose syrup which contains from about 25 to about 90% by weight fructose solids, the total amount of sugar being within the range of from about 30 to about 80% by weight of said chewing gum, and from about 8 to about 30% by weight of said chewing gum being pure fructose syrup which serves as a humectant admixed with said particles of sugar containing gum base.

2. The chewing gum as defined in claim 1 wherein said pure fructose syrup contains from about 40 to about 90% by weight fructose solids.

3. The chewing gum as defined in claim 1 wherein said gum base is bubble gum base.

4. The chewing gum as defined in claim 1 wherein said gum base is non-bubble gum base.

5. A method for forming a chewing gum as defined in claim 1 which comprises dispersing in gum base particles a first portion of sugar to form a continuous phase and thereafter mixing the continuous phase with a second portion of sugar causing the continuous phase to be torn into discrete masses of gum base enveloping the particles of sugar and mixing said pure fructose syrup with the mixture of discrete gum base masses and sugar to form a chewing gum which is smooth and continuous.

* * * * *